US008214768B2

(12) United States Patent
Boule et al.

(10) Patent No.: US 8,214,768 B2
(45) Date of Patent: Jul. 3, 2012

(54) METHOD, SYSTEM, AND GRAPHICAL USER INTERFACE FOR VIEWING MULTIPLE APPLICATION WINDOWS

(75) Inventors: Andre M. J. Boule, Sunnyvale, CA (US); Chris Blumenberg, San Francisco, CA (US); Richard Williamson, Los Gatos, CA (US); Stephen O. Lemay, San Francisco, CA (US); Marcel Van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1072 days.

(21) Appl. No.: 11/620,647

(22) Filed: Jan. 5, 2007

(65) Prior Publication Data
US 2008/0168401 A1 Jul. 10, 2008

(51) Int. Cl.
*G06F 3/033* (2006.01)
(52) U.S. Cl. ........................................ 715/863; 715/864
(58) Field of Classification Search .................. 715/863, 715/864
See application file for complete search history.

(56) References Cited

U.S. PATENT DOCUMENTS

| 5,612,719 | A | 3/1997 | Beernink et al. ............... 345/173 |
| 5,760,773 | A | 6/1998 | Berman et al. |
| 6,025,842 | A | 2/2000 | Filetto et al. ................... 345/345 |
| 6,073,036 | A | 6/2000 | Heikkinen et al. |
| 6,177,936 | B1 * | 1/2001 | Cragun ........................... 715/760 |
| 6,199,082 | B1 | 3/2001 | Ferrel et al. |
| 6,243,080 | B1 | 6/2001 | Molne |
| 6,262,732 | B1 * | 7/2001 | Coleman et al. ............... 715/835 |
| 6,297,795 | B1 | 10/2001 | Kato et al. |
| 6,326,970 | B1 | 12/2001 | Mott et al. |
| 6,349,410 | B1 | 2/2002 | Lortz |
| 6,359,615 | B1 | 3/2002 | Singh |
| 6,411,283 | B1 | 6/2002 | Murphy |
| 6,466,198 | B1 | 10/2002 | Feinstein |
| 6,466,203 | B2 | 10/2002 | Van Ee |
| 6,486,895 | B1 | 11/2002 | Robertson et al. |
| 6,489,975 | B1 | 12/2002 | Patil et al. ...................... 345/781 |
| 6,496,182 | B1 | 12/2002 | Wong et al. |
| 6,570,583 | B1 | 5/2003 | Kung et al. |
| 6,590,568 | B1 | 7/2003 | Astala et al. |

(Continued)

FOREIGN PATENT DOCUMENTS
EP 0 476 972 A2 3/1992
(Continued)

OTHER PUBLICATIONS

International Search Report and Written Opinion for International Application PCT/US2007/088879 dated Jun. 30, 2008.

(Continued)

*Primary Examiner* — William Bashore
*Assistant Examiner* — Gregory A Distefano
(74) *Attorney, Agent, or Firm* — Morgan, Lewis & Bockius LLP

(57) ABSTRACT

Methods, systems, and graphical user interfaces for viewing multiple application windows are disclosed. In one embodiment, a portable electronic device with a touch screen display: displays an application, which includes a displayed window and at least one hidden window; displays an icon for adding windows to the application; detects activation of the icon for adding windows; in response to detecting activation of the icon for adding windows, adds a window to the application; detects a gesture on the touch screen display; and, in response to detecting the gesture, moves a displayed window in the application off the display and moves a hidden window onto the display.

19 Claims, 10 Drawing Sheets

U.S. PATENT DOCUMENTS

| | | | |
|---|---|---|---|
| 6,613,100 B2 | 9/2003 | Miller | 715/526 |
| 6,639,584 B1 | 10/2003 | Li | |
| 6,771,250 B2 | 8/2004 | Oh | |
| 6,928,461 B2 | 8/2005 | Tuli | |
| 7,054,965 B2 | 5/2006 | Bell et al. | |
| 7,075,512 B1 | 7/2006 | Fabre et al. | 345/156 |
| 7,085,590 B2 | 8/2006 | Kennedy et al. | |
| 7,149,549 B1 | 12/2006 | Ortiz et al. | |
| 7,166,791 B2 | 1/2007 | Robbin et al. | 84/477 |
| 7,171,625 B1 | 1/2007 | Sacchi | |
| 7,346,855 B2* | 3/2008 | Hellyar et al. | 715/783 |
| 7,461,353 B2 | 12/2008 | Rohrabaugh et al. | |
| 7,587,671 B2 | 9/2009 | Saft et al. | |
| 7,788,583 B1 | 8/2010 | Amzallag et al. | |
| 7,831,926 B2 | 11/2010 | Rohrabaugh et al. | |
| 7,844,889 B2 | 11/2010 | Rohrabaugh et al. | |
| 2002/0015064 A1 | 2/2002 | Robotham et al. | 345/863 |
| 2002/0093531 A1 | 7/2002 | Barile | |
| 2002/0152283 A1 | 10/2002 | Dutta et al. | |
| 2003/0013483 A1 | 1/2003 | Ausems et al. | |
| 2003/0025676 A1 | 2/2003 | Cappendijk | |
| 2003/0033331 A1 | 2/2003 | Sena et al. | 707/513 |
| 2003/0081135 A1 | 5/2003 | Boll | 348/333.01 |
| 2003/0095135 A1 | 5/2003 | Kaasila et al. | |
| 2003/0095155 A1 | 5/2003 | Johnson | |
| 2003/0164861 A1 | 9/2003 | Barbanson et al. | |
| 2003/0193524 A1* | 10/2003 | Bates et al. | 345/786 |
| 2004/0143796 A1 | 7/2004 | Lerner et al. | |
| 2004/0169674 A1 | 9/2004 | Linjama | |
| 2004/0201595 A1 | 10/2004 | Manchester | |
| 2004/0268400 A1 | 12/2004 | Barde et al. | |
| 2005/0005246 A1 | 1/2005 | Card et al. | |
| 2005/0020317 A1 | 1/2005 | Koyama | |
| 2005/0044509 A1 | 2/2005 | Hunleth et al. | |
| 2005/0057524 A1 | 3/2005 | Hill et al. | 345/173 |
| 2005/0066286 A1 | 3/2005 | Makela | 715/764 |
| 2005/0071364 A1 | 3/2005 | Xie et al. | |
| 2005/0071736 A1 | 3/2005 | Schneider et al. | |
| 2005/0071778 A1 | 3/2005 | Tokkonen | |
| 2005/0079896 A1 | 4/2005 | Kokko et al. | |
| 2005/0093826 A1 | 5/2005 | Huh | |
| 2005/0114788 A1 | 5/2005 | Fabritius | 715/767 |
| 2005/0166232 A1 | 7/2005 | Lamkin et al. | |
| 2005/0177783 A1 | 8/2005 | Agrawala et al. | |
| 2005/0183017 A1 | 8/2005 | Cain | |
| 2005/0204385 A1 | 9/2005 | Sull et al. | |
| 2005/0285880 A1 | 12/2005 | Lai et al. | 345/660 |
| 2006/0017692 A1 | 1/2006 | Wehrenberg et al. | |
| 2006/0026521 A1* | 2/2006 | Hotelling et al. | 715/702 |
| 2006/0033761 A1 | 2/2006 | Suen et al. | |
| 2006/0036944 A1* | 2/2006 | Wilson | 715/702 |
| 2006/0053387 A1 | 3/2006 | Ording | 715/773 |
| 2006/0064647 A1 | 3/2006 | Tapuska et al. | |
| 2006/0085743 A1 | 4/2006 | Baudisch et al. | |
| 2006/0097991 A1 | 5/2006 | Hotelling et al. | |
| 2006/0101354 A1 | 5/2006 | Hashimoto et al. | |
| 2006/0125799 A1 | 6/2006 | Hillis et al. | 345/173 |
| 2006/0143574 A1 | 6/2006 | Ito et al. | |
| 2006/0146016 A1 | 7/2006 | Chan et al. | |
| 2006/0146038 A1 | 7/2006 | Park et al. | |
| 2006/0197753 A1 | 9/2006 | Hotelling | |
| 2006/0265643 A1 | 11/2006 | Saft et al. | |
| 2006/0277588 A1 | 12/2006 | Harrington et al. | |
| 2006/0284852 A1 | 12/2006 | Hofmeister et al. | 345/173 |
| 2007/0004451 A1 | 1/2007 | Anderson | |
| 2007/0024646 A1 | 2/2007 | Saarinen et al. | |
| 2007/0038612 A1 | 2/2007 | Sull et al. | |
| 2007/0106952 A1 | 5/2007 | Matas et al. | |
| 2007/0152984 A1 | 7/2007 | Ording et al. | |
| 2007/0155434 A1 | 7/2007 | Jobs et al. | |
| 2007/0157228 A1 | 7/2007 | Bayer et al. | |
| 2007/0250768 A1 | 10/2007 | Funakami et al. | 715/521 |
| 2008/0062137 A1 | 3/2008 | Brodersen et al. | |
| 2008/0122796 A1* | 5/2008 | Jobs et al. | 345/173 |

FOREIGN PATENT DOCUMENTS

| | | |
|---|---|---|
| EP | 0 651 544 A2 | 5/1995 |
| EP | 0 701 220 A1 | 3/1996 |
| EP | 0 880 090 A2 | 11/1998 |
| EP | 1 049 305 A1 | 11/2000 |
| EP | 1 517 228 A2 | 3/2005 |
| EP | 1 632 874 A2 | 3/2006 |
| EP | 1 752 880 A1 | 2/2007 |
| JP | 11 143604 | 5/1999 |
| JP | 2000 181436 | 6/2000 |
| JP | 2001 175386 | 6/2001 |
| JP | 2002 244635 | 8/2002 |
| JP | 2004 288208 | 10/2004 |
| JP | 2004 318505 | 11/2004 |
| JP | 2005 018229 | 1/2005 |
| JP | 2005 242669 | 9/2005 |
| JP | 2005 267049 | 9/2005 |
| WO | WO 99/54807 A1 | 10/1999 |
| WO | WO 02/46903 A1 | 6/2002 |
| WO | WO 02/082418 A2 | 10/2002 |
| WO | WO 02/093542 A1 | 11/2002 |
| WO | WO 03/052626 A1 | 6/2003 |
| WO | WO 2004/021166 A1 | 3/2004 |
| WO | WO 2004/040481 A1 | 5/2004 |
| WO | WO 2005/036416 A2 | 4/2005 |
| WO | WO 2005/041020 A1 | 5/2005 |
| WO | WO 2005/074268 A1 | 8/2005 |
| WO | WO 2005/106684 A1 | 11/2005 |
| WO | WO 2006/003591 A2 | 1/2006 |
| WO | WO 2006/020304 A2 | 2/2006 |
| WO | WO 2006/020305 A2 | 2/2006 |
| WO | WO 2008/030874 A1 | 3/2008 |
| WO | WO 2008/030976 A2 | 3/2008 |
| WO | WO 2008/086303 A1 | 7/2008 |

OTHER PUBLICATIONS

Holmquist, L., "The Zoom Browser Showing Simultaneous Detail and Overview in Large Documents," retrieved Dec. 17, 2007, Human IT, 1998, http://www.hb.se/bhs/ith/3-98/leh.htm.

Khella, A. et al., "Pocket PhotoMesa: A Zoomable Image Browser for PDAs," retrieved Dec. 17, 2007, Proceedin, http://delivery.acm.org/10.1145/1060000/1052384/p19-khella.pdf?key1=1052384&key2=2419987911&coll=GUIDE&dl=GUIDE&CFID=47073625&CFTOKEN=65767142.

Wobbrock, J. et al., "WebThumb: Interaction Techniques for Small-Screen Browsers," UIST'02, Oct. 27-30, 2002, Paris France, 4 pages.

Invitation to Pay Additional Fees for International Application No. PCT/US2007/077644 mailed Jan. 23, 2008.

International Search Report and Written Opinion for International Application No. PCT/US2007/077644, mailed May 30, 2008.

European Search Report dated Jan. 26, 2010, European Application No. 09171787.6-2212, which corresponds to U.S. Appl. No. 11/850,013.

Office Action dated Jun. 11, 2010, U.S. Appl. No. 11/850,013.

Examiner's Report dated Mar. 24, 2010, Australian Patent Application No. 2007292383, which corresponds to U.S. Appl. No. 11/850,013, 2 pages.

Office Action dated Sep. 28, 2009, Australian Patent Application No. 2009100760, which corresponds to U.S. Appl. No. 11/850,013.

Bitstream®, "ThunderHawk Pocket PC Edition for End Users," 2005, 4 pages, http://www.bitstream.com/wireless/products/pocketpc/faq_using.html.

FingerWorks, "Installation and Operation Guide for the TouchStream," Copyright© 2002, 14 pages, www.fingerworks.com.

FingerWorks, "QuickReference Guide for iGesture Products," Copyright© 1999-2002, 4 pages, www.fingerworks.com.

FingerWorks, "Installation and Operation Guide for Igesture Products w/Keys," Copyright © 2002, 10 pages, www.fingerworks.com.

FingerWorks, "TouchStream LP Silver," Apr. 27, 2005, 18 pages, http://www.fingerworks.com.

International Search Report and Written Opinion dated Jan. 15, 2008, International Application No. PCT/US2007/077773, which corresponds to U.S. Appl. No. 11/850,638.

Office Action dated Dec. 27, 2010, European Application No. 07 869 929.5, which corresponds to U.S. Appl. No. 11/620,647.
Office Action dated Oct. 26, 2010, U.S. Appl. No. 11/850,638.
Final Office Action dated Feb. 8, 2011, U.S. Appl. No. 11/850,638.
Office Action dated Jul. 2, 2009, Australian Patent Application No. 2007289019, which corresponds to U.S. Appl. No. 11/850,638.
Office Action dated Oct. 7, 2009, Australian Patent Application 2007289019, which corresponds to U.S. Appl. No. 11/850,638.
Office Action dated Jan. 15, 2010, Chinese Application for Invention No. 200780001140.9, which corresponds to U.S. Appl. No. 11/850,638.
Office Action dated Nov. 12, 2010, Korean Patent Application No. 10 2009 7007067, which corresponds to U.S. Appl. No. 11/850,638.
Agarwal, A., "iTunesInlineVideo," Digital Inspiration—The Tech Guide, 27 pages, http://labnol.blogspot.com/2006_09_17_labnol_archive.html, Sep. 23, 2006.
Ahmad, I. et al., "Content-Based Image Retrieval on Mobile Devices," Proc. Of SPIE-IS&T Electronic Imaging, vol. 5684, 2005, 10 pages.
Alam, H. et al., "Web Document Manipulation for Small Screen Devices: A Review," 4 pages, http://www.csc.liv.ac.uk/~wda2003/Papers/Section_II/Paper_8.pdf, 2003.
Alejandre, S., "Graphing Linear Equations," Jun. 12, 2006, 3 pages, http://mathforum.org/alejandre/palm/times.palm.html.
Apparao, V. et al., "Level 1 Document Object Model Specification," W3C Working Draft Jul. 20, 1998, 3 pages, http://www.w3.org/TR/WD-DOM/.
Baudisch, P., "Collapse-to-Zoom: Viewing Web Pages on Small Screen Devices by Interactively Removing Irrelevant Content," Oct. 24-27, 2004, 4 pages.
Bos, B. et al., "3 Conformance: Requirements and Recommendations," Cascading Style Sheets, level 2 CSS2 Specification, W3C Recommendation, May 12, 1998, 6 pages, http://www.w3.org/TR/CSS21/conform.html#doctree.
Buyukkokten, O. et al., "Power Browser: Efficient Web Browsing for PDAs," Digital Libraries Lab (InfoLab), Stanford University, Stanford, CA, 2000, 8 pages.
Chen et al., "A novel navigation and transmission technique for mobile handheld devices," Technical Report CSE-2003-1, Department of Computer Science, University of California at Davis, 2003, 8 pages, available at http://www.cs.ucdavis.edu/research/tech-r.
Chen et al., "DRESS: A Slicing Tree Based Web Representation for Various Display Sizes," Microsoft Researach, Technical Report MSR-TR-2002-126, Nov. 16, 2002, 9 pages.
Chen, Y., "Detecting Web Page Structure for Adaptive Viewing on Small Form Factor Devices," Microsoft Research, i-yuchen@microsoft.com, May 20-24, 2003, 9 pages.
CNET, "Fujitsu LifeBook B6110D," CNET Review, Nov. 24, 2005, 2 pages.
Cooper, A., "The Inmates Are Running the Asylum," Sams Publishing, 1999, pp. 138-147.
Eyemodule, "Turn Your Handspring™ Handheld into a Digital Camera," User's Manual, www.eyemodule.com, 9 pages.
Fling, B., "Designing for Mobile, Bringing Design Down to Size," © 2006 Blue Flavor, brian@blueflavor.com.
Gears, "Orange SPV C600 Review," coolsmartphone.com, Apr. 14, 2006, 58 pages, http://www.coolsmartphone.com/article569.html.
Getgreg, "Jeff Han's Multiple Touch Point Display, the Stuff Dreams are Made of," Aug. 16, 2006, 2 pages, http://www.theyshoulddothat.com2006/08/jeff_hanns_multiple_touch_poin.html>.
Guan et al., "Zoom Selector: A Pen-based Interaction Technique for Small Target Selection," Transactions of the Information Processing Society of Japan, Aug. 2004, vol. 45, No. 8, pp. 2087-2097, Inf. Process. Soc. Japan, ISSN 0387-5806.
Han, J., "Talks Jeff Han: Unveiling the Genius of Multi-touch Interface Design," Ted Ideas Worth Spreading, Aug. 6, 2006, 1 page, http://www.ted.com/inhttp://www.ted.com/index.php/talks/view/id/65>.
Hart, K., "Rewriting the Web for Mobile Phones," washingtonpost.com, Jul. 26, 2006, 2 pages, http://www.washingtonpost.com/wp-dyn/content/article/2006/07/25/AR2006072501517_pf.html.
Hinckley et al., "Input/Output Devices and Interaction Techniques," Microsoft Research, 79 pages.
Karlson et al., "AppLens and LaunchTile: Two Designs for One-handed Thumb Use on Small Devices," printed Jun. 12, 2006, 11 pages, http://hcil.cs.umd.edu/trs/2004-37/2004-37.html.
Kinoma, Kinoma Player 4 EX Documentation [online], Archived Nov. 1, 2006, 28 pages, http://replay.waybackmachine.org/20061101175306/http://www.kinoma.com/index/pd-player-4.
Laakko et al., "Adapting Web Content to Mobile User Agents," IEEE Internet Computing, vol. 9, Issue 2, Mar./Apr. 2005, 8 pages.
Landragin, F., "The Role of Gesture in Multimodal Referring Actions," Proceedings of the Fourth IEEE Internaational Conference on Multimodal Interfaces, 2002, 6 pages, http://ieeexplore.iee.org/ie15/8346i/26309/01166988pdf?arnumber=116i6988>.
Lie, H., "Cascading Style Sheets," 2005, pp. 243-247, http://people.opera.com/howcome/2006/phd/css.pdf.
Microsoft Word, "Example of scrolling pages in Word 2003," Microsoft Word 2003, 3 pages.
Milic-Frayling, N. et al., "Smartview:Enhanced Document Viewer for Mobile Devices," ftp:ftp.research.microsoft.com/pub/tr/tr-2002-114.pdf, retrieved Dec. 17, 2007, Microsoft Technical Report, Nov. 15, 2002, URL, 9 pages.
Milic-Frayling, N. et al., "Smartview: Flexible Viewing of Web Page Contents," The Eleventh International World Wide Web Conference, May 11, 2002, 4 pages, http://www2002.org/CDROM/poster/172/>.
Opera Software, "Download the Opera Mobile™ Browser," 5 pages, http://www.opera.com/products/mobile/products/.
Opera Software, "Opera for Mobile, The Full Web Anytime, Anywhere," Jan. 2006, 7 pages, www.opera.com/mobile.
Opera Software, "Opera for S60 Tutorial," Apr. 5, 2006, 5 pages, http://www.opera.com/support/tutorials/S60/.
Opera—Press Releases Database, "The New Opera Browser for Series 60 Features Zoom and Password Manager," Nov. 14, 2005, 3 pages, http://press-releases.techwhack.com/1334/1411-opera-browser-features-zoom-and-password.
Opera Software, "Opera for Windows Mobile Smartphone 2003 Tutorial," Apr. 5, 2005, 4 pages, http://www.opera.com/support/tutorials/winmobile.
Opera Software, "Opera 7.60 for Series 60 Mobile," http://jp.opera.com/support/tutorials/s60/760/O760manual.pdf.
Opera Software, "Opera 8.5 Beta 2 for Windows Mobile, Pocket PC," Apr. 5, 2006, 2 pages, http://www.opera.com/products/mobile/products/winmobileppc.
Opera, "Opera 8.5 for S60 Phones-Get the Full Internet Experience on Your Mobile Phone," Apr. 5, 2006, 3 pages, http://www.symbian-freak.com/news/1105/opera.htm.
Palme, J. et al., "MIME Encapsulation of Aggregate Documents, such as HTML," The Internet Society, 1999, 24 pages.
Raman, B. et al., "Application-specific Workload Shaping in Multi-media-enabled Personal Mobile Devices," CODES + ISSS' 06, Oct. 22-25, 2006, Seoul, Korea, Copyright 2006 ACM, 6 pages.
Robie, J., "What is the Document Object Model?" Texcel Research, 5 pages, http://www.w3.org/TR-DOM/introduction.html.
Rohrer, T., "Metaphors We Compute by: Bringing Magic into Interface Design," http://www.uoregon.edu/-uophil/metaphor/gui4web.htm, printed Jun. 13, 2006, 7 pages.
Roto, V. et al. "Minimap—A Web Page Visualization Method for Mobile Phones," CHI 2006, Nokia Research Center, Apr. 22-27, 2006, 10 pages.
Salmre, I., "Chapter 2, Characteristics of Mobile Applications," Salme_02.fm, pp. 19-36, Dec. 20, 2004.
Schreiner, T., "High DPI in IE: Tip & Mystery Solved," Tony Schreiner's Weblog, May 2004, 2 pages, http://blogs.msdn.com/tonyschr/archive/2004/05/05/126305.aspx.
Stampfli, T., "Exploring Full-Screen Mode in Flash Player 9," Jan. 5, 2007, http://web.archive.org/web20070105231635/http://www.adobe.com/devnet/flashplayer/articles/full_screen_mode.htm.
Stanek, W. et al., "Chapter 9, Video and Animation Plug-Ins," Web Publishing Professional Reference Edition, copyright 1997 by Sams.net Publishing, http://www.ssuet.edu.pk/taimoor/books/1-57521-198-X/index.htm.
Stanek, W. et al., "Chapter 22, Adding Multimedia to Your Web Site," Web Publishing Professional Reference Edition, copyright 1997 by Sams.net Publishing, http://www.ssuet.edu.pk/taimoor/books/1-57521-198-X/index.htm.

Surfin'Safari, "XUL," 7 pages, Oct. 2003, http://weblogs.mozillazine.org/hyatt/archives/2003_10.html.
Tidwell, J., "Animated Transition," from Designing Interfaces, O'Reilly Media, Inc., Nov. 2005, pp. 84-85.
Versiontracker, "Photogather—7.2.6. Hi-res Image Viewer & Editor for Palm," printed Jun. 12, 2006, 5 pages, http://www.versiontracker.com/dyn/moreinfo/palm/4624.
w3schools.com, "Multimedia Video Formats," www.w3sschools.com/media/media_videoformats.asp?output=print, Dec. 20, 2006, 2 pages.
w3schools.com, "Playing QuickTime Movies," http://www.w3schools.com/media/media_quicktime.asp?output=print, Dec. 21, 2006, 2 pages.
w3schools.com, "Playing Videos on the Web," www.w3schools.com/media/media_browservideos.asp?out=print, Dec. 20, 2006, 3 pages.
Wave Technologies, "Certified Internet Webmaster Foundations Study Guide," Wave Technologies International, Inc., a Thomson Learning company, copyright 1988-2000, 88 pages.
Warabino, T. et al., "Video Transcoding Proxy for 3Gwireless Mobile Internet Access," IEEE Communications Magazine, vol. 38, Issue 10, Oct. 2000, 6 pages.
Weblogs, "Chapter 1: Downloading and Building WebCore," WebCore documentation, 2 pages, http://weblogs.mozillazine.org/hyatt/WebCore/chapter1.html, Aug. 4, 2006.
Weblogs, "Chapter 2: An Overview of WebCore," WebCore documentation, 3 pages, http://weblogs.mozillazine.org/hyatt/WebCore/chapter2.html, Aug. 4, 2006.
webmasterworld.com, "Page Zooming with IE," webmasterworld.com, Jul. 2004, 7 pages, http://www.webmasterworld.com/forum83/4179.htm.
Wikipedia, "Comparison of Layout Engines," Wikipedia, the free encyclopedia, 3 pages, http://en.wikipedia.org/wiki/Comparison_of_layout_engines.
Wikipedia, "KDE," Wikipedia, the free encyclopedia, 9 pages, http://en.wikipedia.org/wiki/KDE.
Wikipedia, "KHTML," Wikipedia, the free encyclopedia, 3 pages, http://en.wikipedia.org/wiki/KHTML.
Wikipedia, "List of Layout Engines," 1 page, http://en.wikipedia.org/wiki/List_of_layout_engines.
Wikipedia, "History of YouTube," 2004-2009, downloaded Mar. 15, 2011, 4 pages, http://en.wikipedia.org/wiki/History_of_YouTube.
Williams, M., "LG's Cell Phone Can Pause Live TV," PC World, Oct. 11, 2005, 2 pages.
Xiao, X. et al., "Slicing*-Tree Based Web Page Transformation for Small Displays," CIKM'05, Oct. 31-Nov. 5, 2005, Bremen, Germany, 2 pages.
Xie, X. et al., "Efficient Browsing of Web Search Results on Mobile Devices Based on Block Importance Model," Microsoft Research Asia, mgx03@ mails.tsinghua.edu.cn, 10 pages.
Yin, X. et al., "Using Link Analysis to Improve Layout on Mobile Devices," WWW2004, May 17-22, 2004, 7 pages, http://www.iw3c2.org/WWW2004/docs/1p338.pdf.
YouTube, "Broadcast Yourself," 2 pages, www.youtube.com, Nov. 1, 2005.
YouTube, "Broadcasting Ourselves;)," Nov. 15, 2005, 5 pages, http://youtube-global.blogspot.com/2005_11_01_archive.html.
International Search Report and Written Opinion dated Jul. 11, 2008, International Application No. PCT/US2007/088893, which corresponds to U.S. Appl. No. 11/961,773 (Williamson).
Office Action dated Jun. 10, 2011, Chinese Patent Application No. 200780001140.9, which corresponds to U.S. Appl. No. 11/850,638 (Ording).
Office Action dated Jul. 12, 2011, Japanese Patent Application No. 2009-527566, which corresponds to U.S. Appl. No. 11/850,638 (Ording).
Notice of Final Rejection dated Aug. 30, 2011, Korean Patent Application No. 10-2009-7007067, which corresponds to U.S. Appl. No. 11/850,638 (Ording).
Office Action dated Apr. 15, 2011, U.S. Appl. No. 11/961,773 (Williamson).
Final Office Action dated Nov. 2, 2011, U.S. Appl. No. 11/961,773 (Williamson).
Notice of Allowance dated Oct. 20, 2010, U.S. Appl. No. 11/850,013 (Ording).
Examiner's Report dated May 12, 2011, Australian Patent Application No. 2007292383, which corresponds to U.S. Appl. No. 11/850,013 (Ording).
Office Action dated Oct. 13, 2010, Chinese Patent Application No. 20078004122.6, which corresponds to U.S. Appl. No. 11/850,013 (Ording).
Office Action dated Jun. 2, 2011, Chinese Patent Application No. 200910175852.3, which corresponds to U.S. Appl. No. 11/850,013 (Ording).
Office Action dated Jun. 7, 2010, German Patent Application No. 11 2007 002 107.1-53, which corresponds to U.S. Appl. No. 11/850,013 (Ording).
Office Action dated Jun. 21, 2010, European Application No. 07 814 690.9, which corresponds to U.S. Appl. No. 11/850,013 (Ording).
Office Action dated Oct. 19, 2010, European Application No. 07 814 690.9, which corresponds to U.S. Appl. No. 11/850,013 (Ording).
Office Action dated Jul. 12, 2011, European Patent Application No. 09171787.6, which corresponds to U.S. Appl. No. 11/850,013 (Ording).
Office Action dated Sep. 26, 2011, Japanese Patent Application No. 2009-527541, which corresponds to U.S. Appl. No. 11/850,013 (Ording).
Notice of Allowance dated Oct. 4, 2011, Korean Patent Application No. 10-2009-7007064, which corresponds to U.S. Appl. No. 11/850,013 (Ording).

* cited by examiner

METHOD, SYSTEM, AND GRAPHICAL USER INTERFACE FOR VIEWING MULTIPLE APPLICATION WINDOWS

TECHNICAL FIELD

The disclosed embodiments relate generally to user interfaces, and more particularly, to methods, systems, and graphical user interfaces for viewing multiple windows of an application in a portable device.

BACKGROUND

As portable devices become more compact, and the amount of information to be processed and stored increases, it has become a significant challenge to design a user interface that allows users to easily interact with the device. This is unfortunate since the user interface is the gateway through which users receive not only content but also responses to user actions or behaviors, including user attempts to access a device's features or tools. Some portable electronic devices (e.g., mobile phones) have resorted to adding more pushbuttons, increasing a density of push buttons, overloading the functions of pushbuttons, or using complex menu systems to allow a user to access, store and manipulate data. These conventional user interfaces often result in complicated key sequences and menu hierarchies that must be memorized by the user. In addition, as the number of pushbuttons has increased the proximity of neighboring buttons often makes it difficult for users to activate a desired pushbutton.

Many conventional user interfaces, such as those that include physical pushbuttons, are also inflexible. This is unfortunate since it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Accordingly, there is a need for more transparent and intuitive user interfaces for portable electronic devices that are easy to use, configure, and/or adapt.

SUMMARY

The above deficiencies and other problems associated with user interfaces for portable devices are reduced or eliminated by the disclosed device that includes an interface for viewing multiple application windows.

According to some embodiments, a computer-implemented method includes, at a portable electronic device with a touch screen display, displaying an application. The application includes a displayed window and at least one hidden window. The method further includes displaying an icon for adding windows to the application; detecting activation of the icon for adding windows; in response to detecting activation of the icon for adding windows, adding a window to the application; detecting a gesture on the touch screen display; and in response to detecting the gesture, moving a displayed window in the application off the display and a hidden window onto the display.

According to some embodiments, a graphical user interface on a portable electronic device with a touch screen display includes an icon for adding windows to an application, and a plurality of windows for the application that include a displayed window and at least one hidden window. The plurality of windows is created in response to detection of one or more activations of the icon for adding windows. A gesture on the touch screen is used to move the displayed window off the display and to move a hidden window onto the display.

According to some embodiments, a portable electronic device includes a touch screen display, one or more processors, memory, and a program. The program is stored in the memory and configured to be executed by the one or more processors. The program includes instructions for displaying an application, wherein the application includes a displayed window and at least one hidden window; instructions for displaying an icon for adding windows to the application; instructions for detecting activation of the icon for adding windows; instructions for, in response to detecting activation of the icon for adding windows, adding a window to the application; instructions for detecting a gesture on the touch screen display; and instructions for, in response to detecting the gesture, moving a displayed window in the application off the display and a hidden window onto the display.

According to some embodiments, a computer-program product includes a computer readable storage medium and a computer program mechanism embedded therein. The computer program mechanism includes instructions, which when executed by a portable electronic device with a touch screen display, cause the device to: display an application, wherein the application includes a displayed window and at least one hidden window; display an icon for adding windows to the application; detect activation of the icon for adding windows; in response to detecting activation of the icon for adding windows, add a window to the application; detect a gesture on the touch screen display; and in response to detecting the gesture, move a displayed window in the application off the display and a hidden window onto the display.

According to some embodiments, a portable electronic device with a touch screen display includes means for displaying an application, wherein the application includes a displayed window and at least one hidden window; means for displaying an icon for adding windows to the application; means for detecting activation of the icon for adding windows; means for adding, in response to detecting activation of the icon for adding windows, a window to the application; means for detecting a gesture on the touch screen display; and means for moving, in response to detecting the gesture, a displayed window in the application off the display and a hidden window onto the display.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Attention is now directed to an embodiment of a portable electronic device. In some embodiments, the device is a portable communications device such as a mobile telephone, also known as a cellular telephone. The user interface includes a touch screen and may also include a click wheel. A click wheel is a physical user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. For simplicity, in the discussion that follows, a portable communications device (e.g., a cellular telephone that may also contain other functions, such as SMS, PDA, or music player functions) that includes a touch screen is used as an exemplary embodiment. It should be understood, however, that the user interfaces and associated processes may be applied to other devices, such as personal computers and laptops, which may include one or more other physical user-interface devices, such as a click wheel, a keyboard, a mouse and/or a joystick.

The device may support a variety of applications, such as one or more telephone applications, text messaging, word processing, email, web browsing, and a music player. The music player may be compatible with one or more file formats, such as MP3 and/or AAC. In an exemplary embodiment, the device includes an iPod music player (iPod is a trademark of Apple Computer, Inc.).

The various applications that may be executed on the device may use at least one common physical user-interface device, such as the touch screen. In embodiments that include a touch screen, one or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent to a user.

Figure 1:
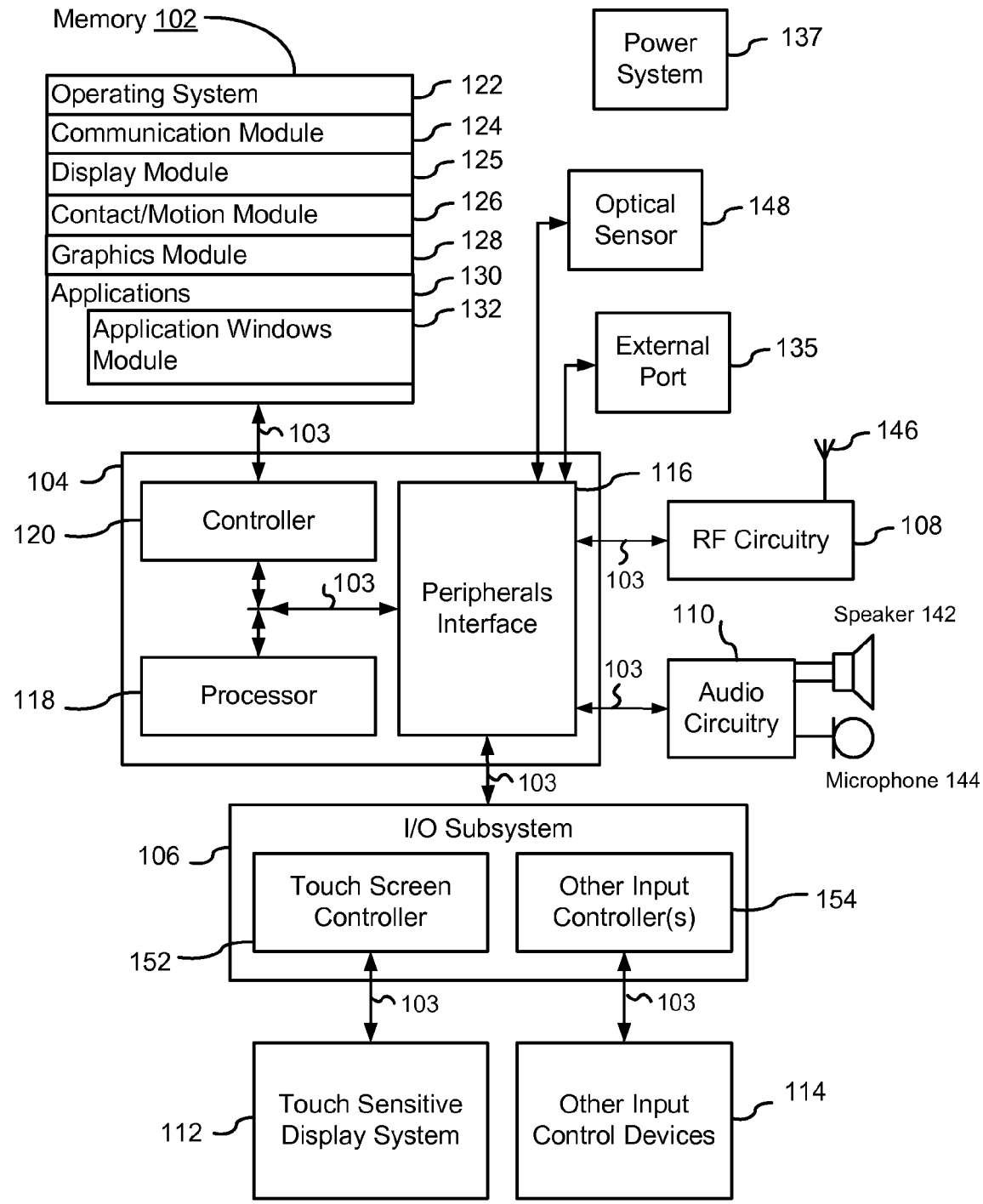
FIG. 1 is a block diagram illustrating a portable electronic device in accordance with some embodiments.

Attention is now directed to an embodiment of a portable electronic device. FIG. 1 is a block diagram illustrating an embodiment of a device 100, such as a portable electronic device having a touch-sensitive display 112. The touch-sensitive display 112 is sometimes called a "touch screen" for convenience. The device 100 may include a memory controller 120, one or more data processors, image processors and/or central processing units 118 and a peripherals interface 116. The memory controller 120, the one or more processors 118 and/or the peripherals interface 116 may be separate components or may be integrated, such as in one or more integrated circuits 104. The various components in the device 100 may be coupled by one or more communication buses or signal lines 103.

If the device 110 includes picture taking capabilities, the peripherals interface 116 is coupled to an optical sensor 148, such as a CMOS or CCD image sensor. The peripherals interface 116 may also be coupled to RF circuitry 108; audio circuitry 110; and/or an input/output (I/O) subsystem 106. The audio circuitry 110 may be coupled to a speaker 142 and a micro-phone 144. The device 100 may support voice recognition and/or voice replication. The RF circuitry 108 may be coupled to one or more antennas 146 and may allow communication with one or more additional devices, computers and/or servers using a wireless network. The device 100 may support a variety of communications protocols, including code division multiple access (CDMA), Global System for Mobile Communications (GSM), Enhanced Data GSM Environment (EDGE), Wi-Fi (such as IEEE 802.11a, IEEE 802.11b, IEEE 802.11g and/or IEEE 802.11n), Bluetooth, Wi-MAX, a protocol for email, instant messaging, and/or a short message service (SMS), or any other suitable communication protocol, including communication protocols not yet developed as of the filing date of this document. In an exemplary embodiment, the device 100 may be, at least in part, a mobile phone (e.g., a cellular telephone).

The I/O subsystem 106 may include a touch screen controller 152 and/or other input controller(s) 154. The touch-screen controller 152 may be coupled to a touch-sensitive screen or touch sensitive display system 112. The touch screen 112 and touch screen controller 152 may detect contact and any movement or break thereof using any of a plurality of touch sensitivity technologies now known or later developed, including but not limited to capacitive, resistive, infrared, and surface acoustic wave technologies, as well as other proximity sensor arrays or other elements for determining one or more points of contact with the touch-sensitive screen 112. A touch-sensitive display in some embodiments of the display system 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, a touch screen in the display system 112 displays visual output from the portable electronic device 100, whereas touch sensitive tablets do not provide visual output. The touch-sensitive screen 112 may have a display resolution in excess of 100 dpi. In an exemplary embodiment, the touch-sensitive screen 112 has a display resolution of approximately 168 dpi. In some embodiments, the touch screen has a display area of at least 1.8 by 3.5 inches and no more than 3.0 inches by 5.0 inches. The other input controller(s) 154 may be coupled to other input/control devices 114, such as one or more buttons. In some alternate embodiments, input controller(s) 154 may be coupled to any (or none) of the following: a keyboard, infra-red port, USB port, and/or a pointer device such as a mouse. The one or more buttons (not shown) may include an up/down button for volume control of the speaker 142 and/or the microphone 144. The one or more buttons (not shown) may include a push button. A quick press of the push button (not shown) may disengage a lock of the touch screen 112. A longer press of the push button (not shown) may turn power to the device 100 on or off. The user may be able to customize a functionality of one or more of the buttons. The touch screen 112 may be used to implement virtual or soft buttons and/or one or more keyboards.

A touch-sensitive display in some embodiments of the display system 112 may be as described in the following applications: (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005; and (9) U.S. patent application Ser. No. 11/367,749, "Multi-Functional Hand-Held Device," filed on Mar. 3, 2006. All of these applications are incorporated by reference herein.

In some embodiments, the device 100 may include circuitry for supporting a location determining capability, such as that provided by the Global Positioning System (GPS). In some embodiments, the device 100 may be used to play back recorded music, such as one or more files, such as MP3 files or AAC files. In some embodiments, the device 100 may include the functionality of an MP3 player, such as an iPod (trademark of Apple Computer, Inc.). In some embodiments, the device 100 may include a multi-pin (e.g., 30-pin) connector that is compatible with the iPod.

The device 100 also includes a power system 137 for powering the various components. The power system 137 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices. The device 100 may also include one or more external ports 135 for connecting the device 100 to other devices.

The memory controller 120 may be coupled to memory 102, which may include one or more types of computer readable medium. Memory 102 may include high-speed random access memory and/or non-volatile memory, such as one or more magnetic disk storage devices, one or more optical storage devices, and/or flash memory. Memory 102 may store an operating system 122, such as Darwin, RTXC, LINUX, UNIX, OS X, WINDOWS, or an embedded operating system such as VxWorks. The operating system 122 may include procedures (or sets of instructions) for handling basic system services and for performing hardware dependent tasks. Memory 102 may also store communication procedures (or sets of instructions) in a communication module 124. The communication procedures may be used for communicating with one or more additional devices, one or more computers and/or one or more servers. The memory 102 may include a display module (or a set of instructions) 125, a contact/motion module (or a set of instructions) 126 to determine one or more points of contact and/or their movement, and a graphics module (or a set of instructions) 128. The graphics module 128 support modules or applications with embedded graphics, including widgets. The widgets may be implemented using JavaScript, HTML, Adobe Flash, or other suitable computer program languages and technologies.

The memory 102 may also include one or more applications 130. Examples of applications that may be stored in memory 102 include telephone applications, email applications, text messaging or instant messaging applications, memo pad applications, address books or contact lists, calendars, picture taking and management applications, and music playing and management applications. The applications 130 may include a web browser (not shown) for rendering pages written in the Hypertext Markup Language (HTML), Wireless Markup Language (WML), or other languages suitable for composing webpages or other online content.

Also included in the memory 102 is an application windows module 132 for managing windows within applications 130, including managing the opening and closing of windows and the moving of windows into and out of view. In some embodiments, the application windows module 132 is a module within an application 130; each application may have its own application windows module. In some other embodiments, the application windows module 132 is a module that is distinct from applications 130. For example, the application windows module 132 may be a part of the operating system 122.

Each of the above identified modules and applications correspond to a set of instructions for performing one or more functions described above. These modules (i.e., sets of instructions) need not be implemented as separate software programs, procedures or modules. The various modules and sub-modules may be rearranged and/or combined. Memory 102 may include additional modules and/or sub-modules, or fewer modules and/or sub-modules. Memory 102, therefore, may include a subset or a superset of the above identified modules and/or sub-modules. Various functions of the device 100 may be implemented in hardware and/or in software, including in one or more signal processing and/or application specific integrated circuits.

Figure 2:
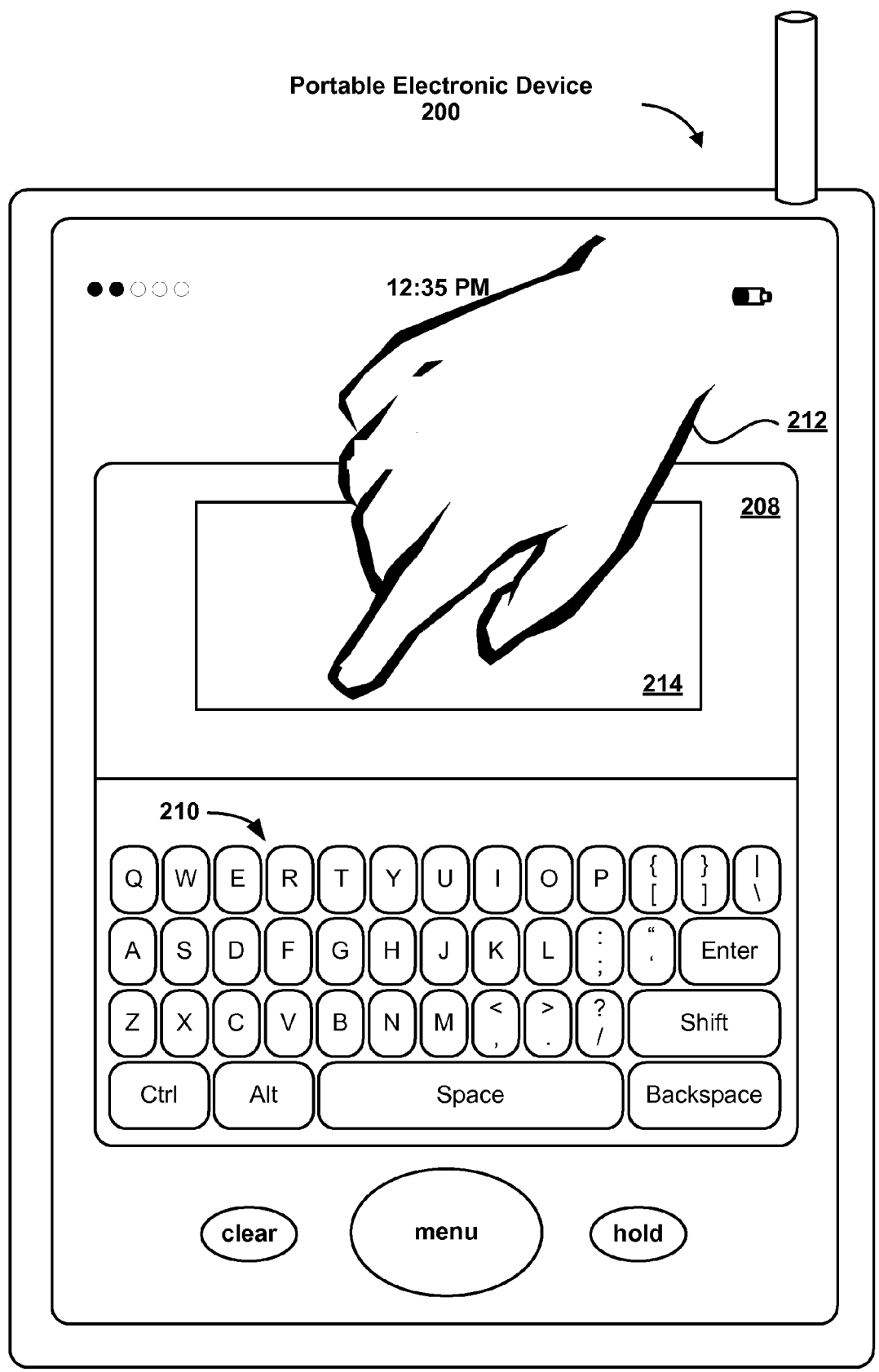
FIG. 2 illustrates a portable electronic device having a touch screen and a soft keyboard in accordance with some embodiments.

Attention is now directed towards embodiments of user interfaces and associated processes that may be implemented on the device 100. FIG. 2 is a schematic diagram illustrating an embodiment of a user interface for a portable electronic device 200. The device 200 includes a touch screen 208. For some applications, the touch screen may display one or more trays. A tray is a defined region or area within a graphical user interface. One tray may include a user entry interface, such as a keyboard 210 that includes a plurality of icons. The icons may include one or more symbols. In this embodiment, as well as others described below, a user may select one or more of the icons, and thus, one or more of the corresponding symbols, by making contact or touching the keyboard 210, for example, with one or more fingers 212 (not drawn to scale in the figure). The contact may correspond to the one or more icons. In some embodiments, selection of one or more icons occurs when the user breaks contact with the one or more icons. In some embodiments, the contact may include a gesture, such as one or more taps, one or more swipes (e.g., from left to right, right to left, upward and/or downward) and/or a rolling of a finger (e.g., from right to left, left to right, upward and/or downward) that has made contact with the device 200. In some embodiments, inadvertent contact with an icon may not select a corresponding symbol. For example, a swipe gesture that sweeps over an icon may not select a corresponding symbol if the gesture corresponding to selection is a tap gesture.

The device 200 may include a display tray 214, which is displayed on the touch screen 208. The display tray 214 may display one or more of the characters and/or symbols that are selected by the user. The device 200 may also include one or more physical buttons, such as the clear, hold and menu buttons shown in FIG. 2. The menu button may be used to navigate to any application in a set of applications that may be executed on the device 200. Alternatively, in some embodiments, the clear, hold, and/or menu buttons are implemented as soft keys in a GUI in touch screen 208.

Figure 3:
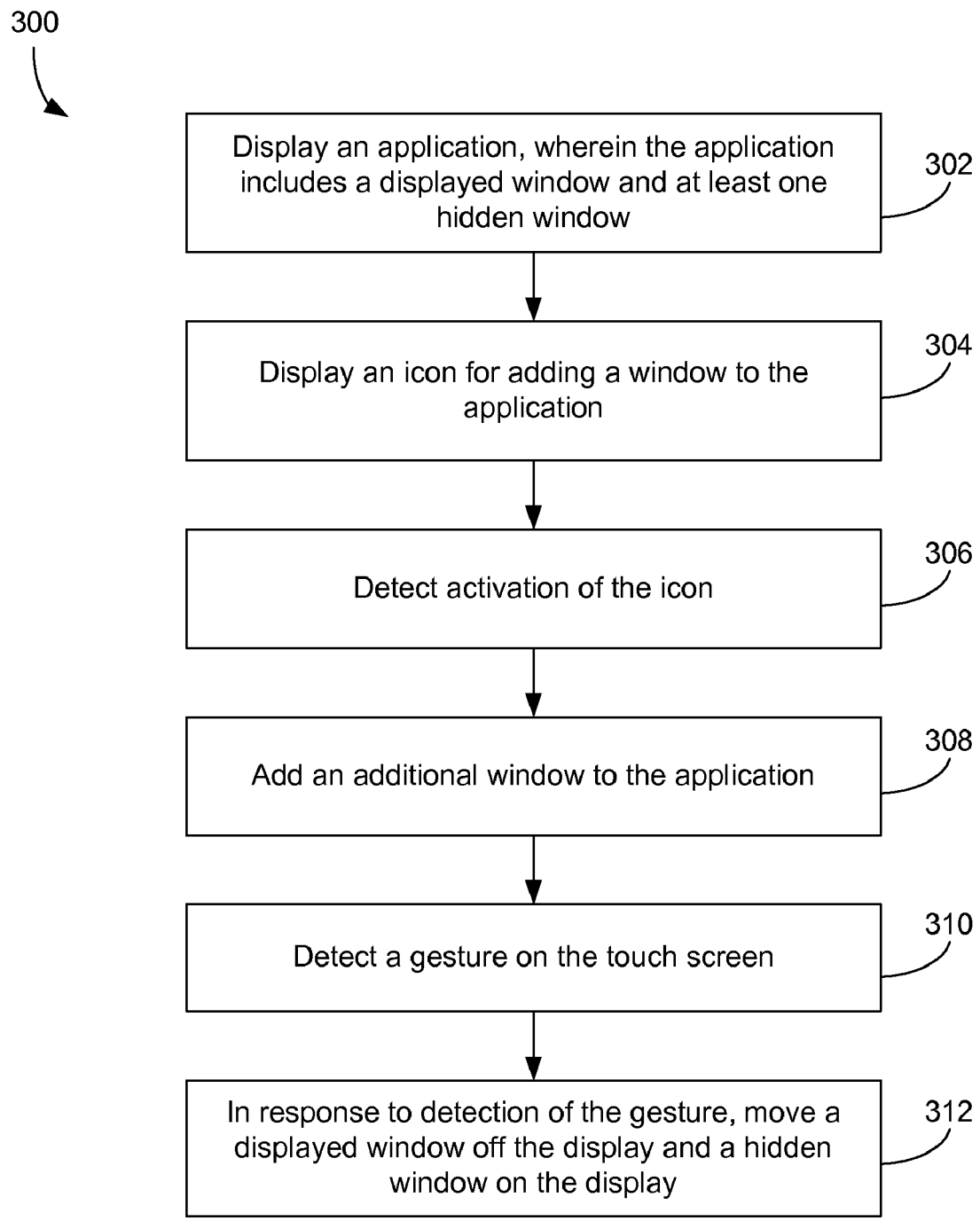
FIG. 3 is a flow diagram illustrating a process for viewing multiple application windows in accordance with some embodiments.

Attention is now directed to FIG. 3, which illustrates a process flow 300 for viewing multiple application windows in accordance with some embodiments. An application is displayed, wherein the application includes a hidden window and a displayed window (302). In some embodiments, the windows are caused to be displayed on the touch screen by the application windows module 132. The application may have a plurality of windows; one window is displayed in the touch screen and any other windows that are open are hidden from view. In some embodiments, the application is a web browser, and online content, such as webpages, images and other content that are accessible online, is displayed in the plurality of windows. Each window may display a distinct webpage or other content.

An icon for adding or opening new windows is displayed (304). In some embodiments, the icon for adding or opening new windows is displayed in response to detection of activation of an icon for initiating creation of multiple windows. That is, the application may display a window and the icon for initiation creation of multiple windows. If the user activates the icon for initiating creation of multiple windows and the activation is detected, the icon for adding new windows is displayed.

Activation of the icon for adding a window is detected (306). In response to activation of the icon, a third window is added to the application and displayed, and the first and second windows are hidden from view (or kept hidden if already hidden) (308). A gesture on the touch screen is detected (310). In response to detection of the gesture, the displayed third window is moved out of view (hidden from view) and a hidden window is moved into view and displayed in the touch screen (312). The hidden window that is displayed may be the first window or the second window. In some embodiments, the user can move each of the windows into view, one at a time. For example, the user can perform a predefined gesture, such as swipe or sweeping gestures in one direction or tap gestures on one side of the touch screen, to move each window into view in a particular order (e.g., the first window, then the second window, then the third window, etc.), and the user can perform another predefined gesture, such as swipe or sweeping gestures in the opposite direction or tap gestures on the opposite side of the touch screen, to move each window into view in the opposite order. Along the way, the user may change the order of the displaying of the windows by changing the gesture (e.g., by changing the direction or location of the gesture). When a particular window that the user wishes to have displayed is displayed on the touch screen, the user may stop performing the predefined gestures to stop moving other windows into view.

More generally, when a user activates an application in the device, one window is initially open. The user may open any number of additional windows in the application by activating an icon for adding new windows or the like. The icon for adding new windows may be displayed by default or displayed after the user first activates an icon for initiating creation of multiple windows. When multiple windows are open, one is displayed and the others are hidden. The user may perform a gesture to move the displayed window out of view and move a hidden window into view. Which window is displayed into view may be controlled by varying the gesture that is performed.

Attention is now directed to FIGS. 4A-4G, which illustrate a user interface for viewing multiple application windows in accordance with some embodiments. When the user first runs an application, a first window 402 is displayed on the touch screen 208. An icon to initiate creation of multiple windows 404 may be displayed. When the user activates the icon to initiate creation of multiple windows 404 by making contact on the touch screen 208 at the area of the icon 404 with a finger 212 (not drawn to scale) and the contact is detected by the device 200, an icon for adding new windows 406 may be displayed. In some embodiments, the icon for adding new windows 406 is, by default, displayed when the application is run; the user does not have to activate an icon to initiate creation of multiple windows first. In some other embodiments, the user has to activate the icon to initiate creation of multiple windows 404 first in order to bring up the icon for adding new windows 406.

When the user activates the new windows icon 406, by making contact with a finger 212 on the touch screen 208 at the area of the new windows icon 406 and the contact is detected by the device 200, a second window 410 is displayed and the first window 402 becomes hidden. In some embodiments, an animation of the first window moving out of view may be displayed on the touch screen to give the user visual feedback that the first window is becoming hidden.

Figure 4A:
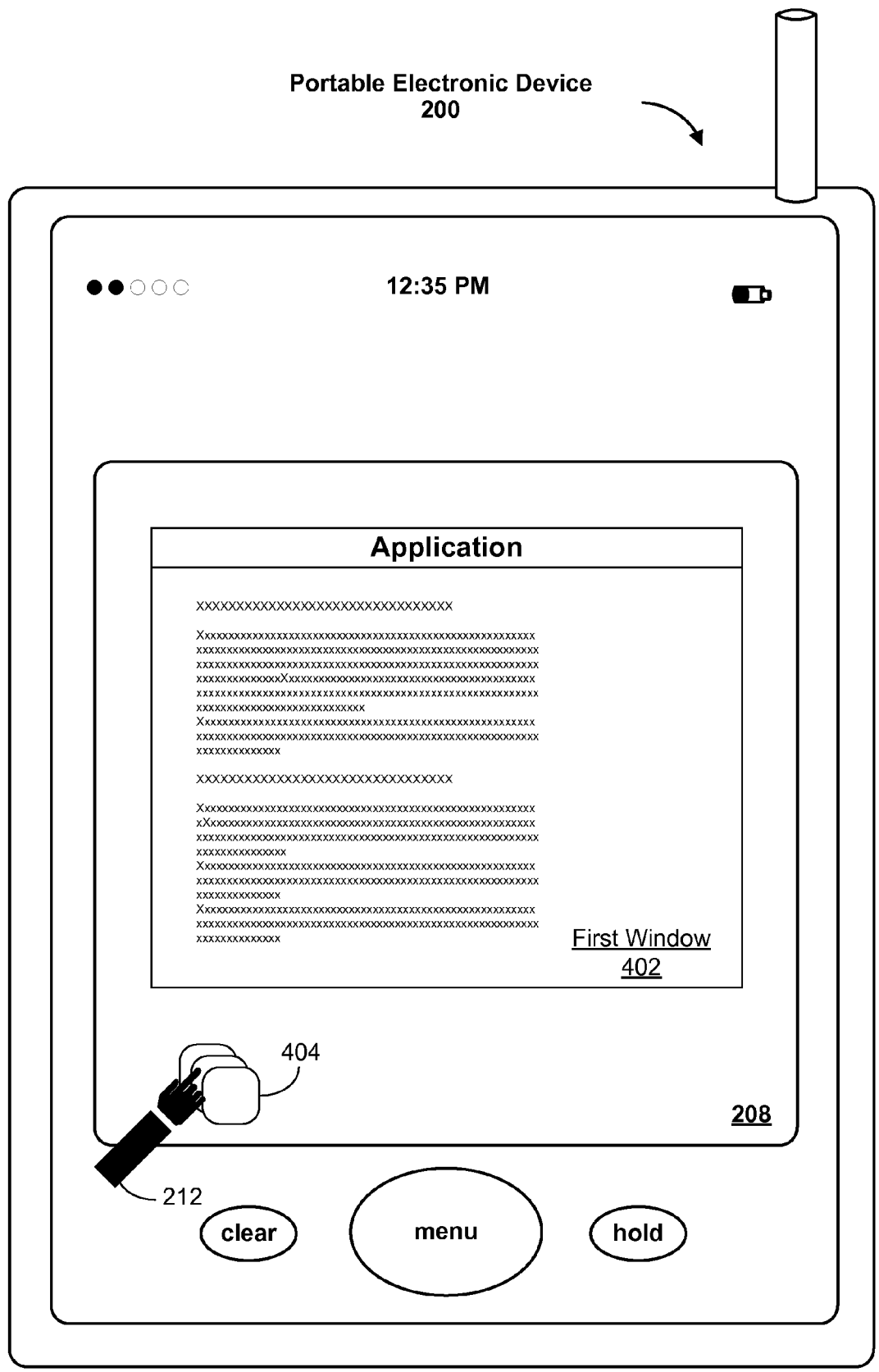
FIGS. 4A-4G illustrate a user interface for viewing multiple application windows in accordance with some embodiments.
Figure 4B:
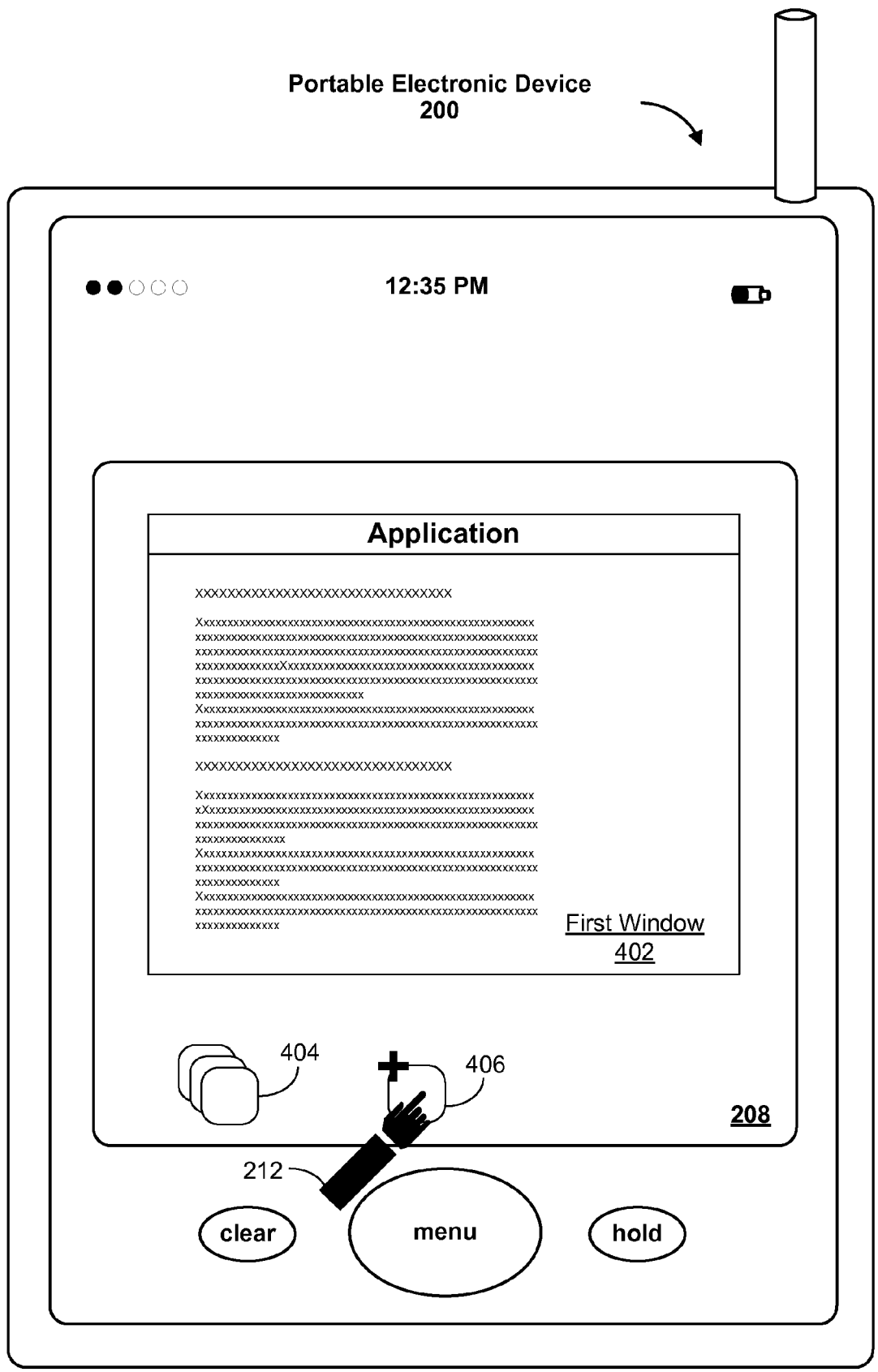
Figure 4C:
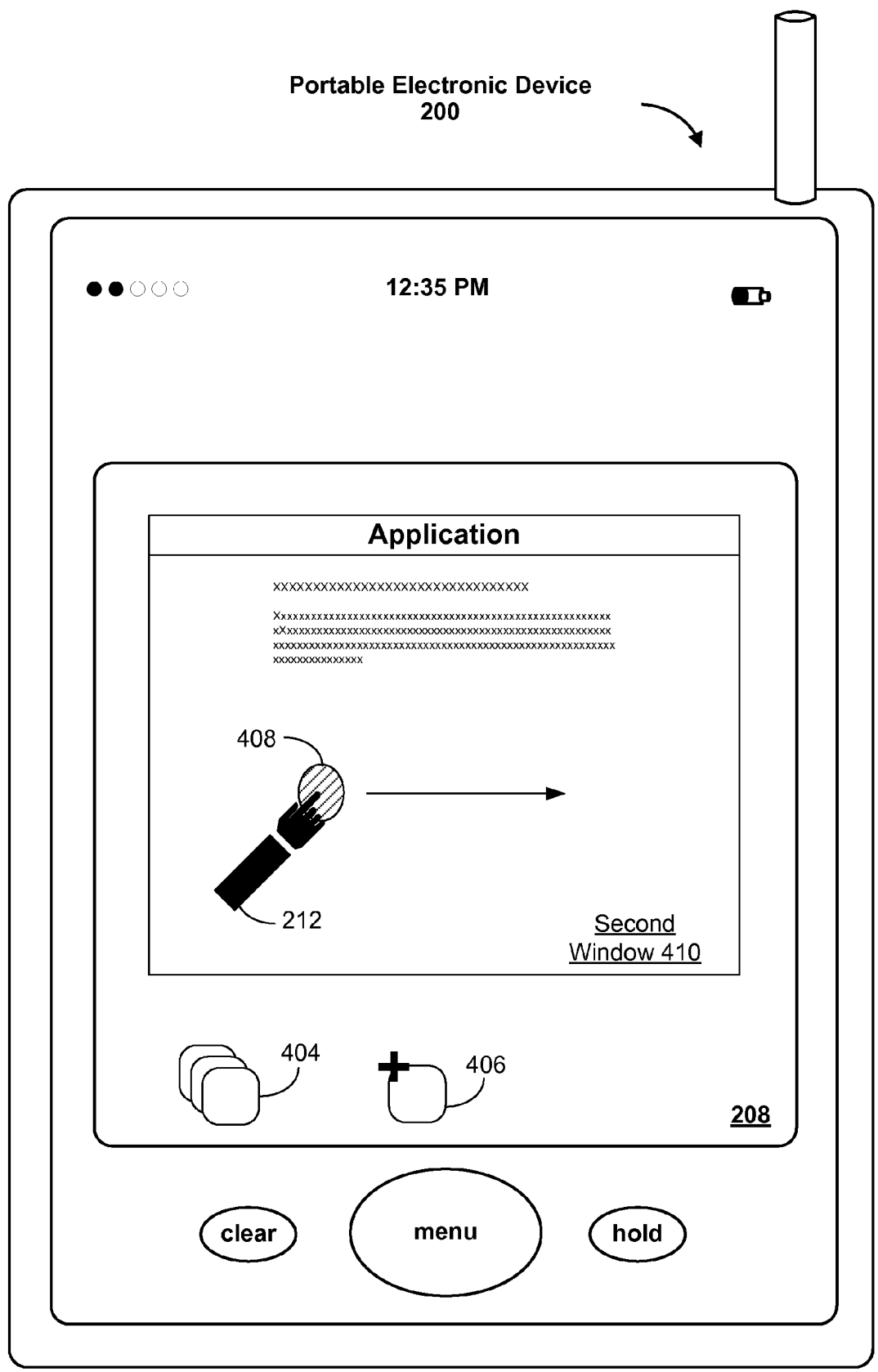
Figure 4D:
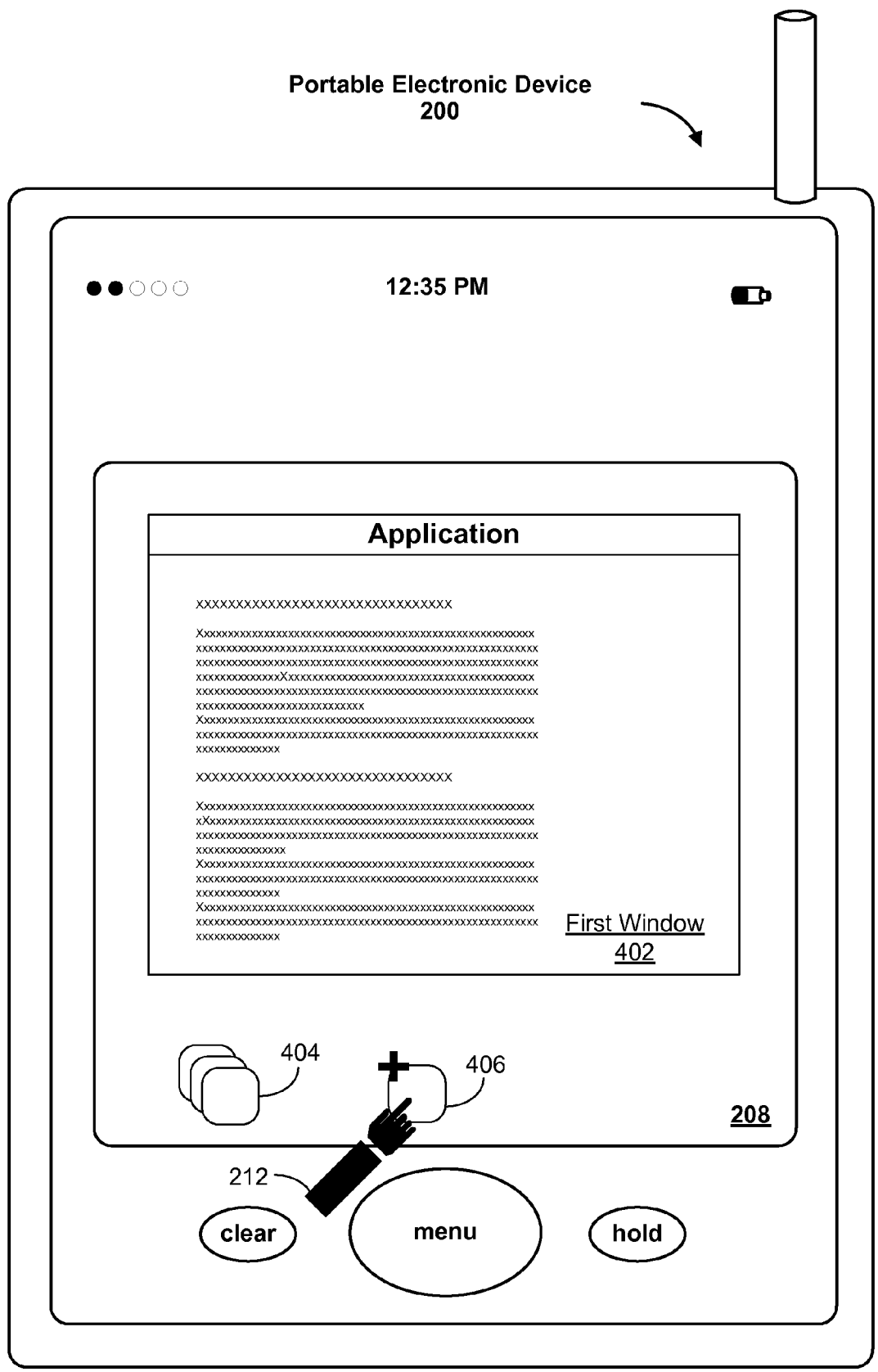

While the second window 410 is displayed and the first window 402 is hidden, the user may perform a predefined gesture on the touch screen 208. When the gesture is detected by the device 200, the second window may be moved out of view and the first window may be displayed. In some embodiments, the gesture is a swipe or a sweeping motion with the finger 212 (as indicated in FIG. 4C). In some other embodiments, the gesture may be one or more taps. For example, the gesture may be two taps on one side of the touch screen 208. More generally, the predefined gesture for moving the displayed window out of view and a hidden window into view may vary by the particular embodiment.

Figure 4E:
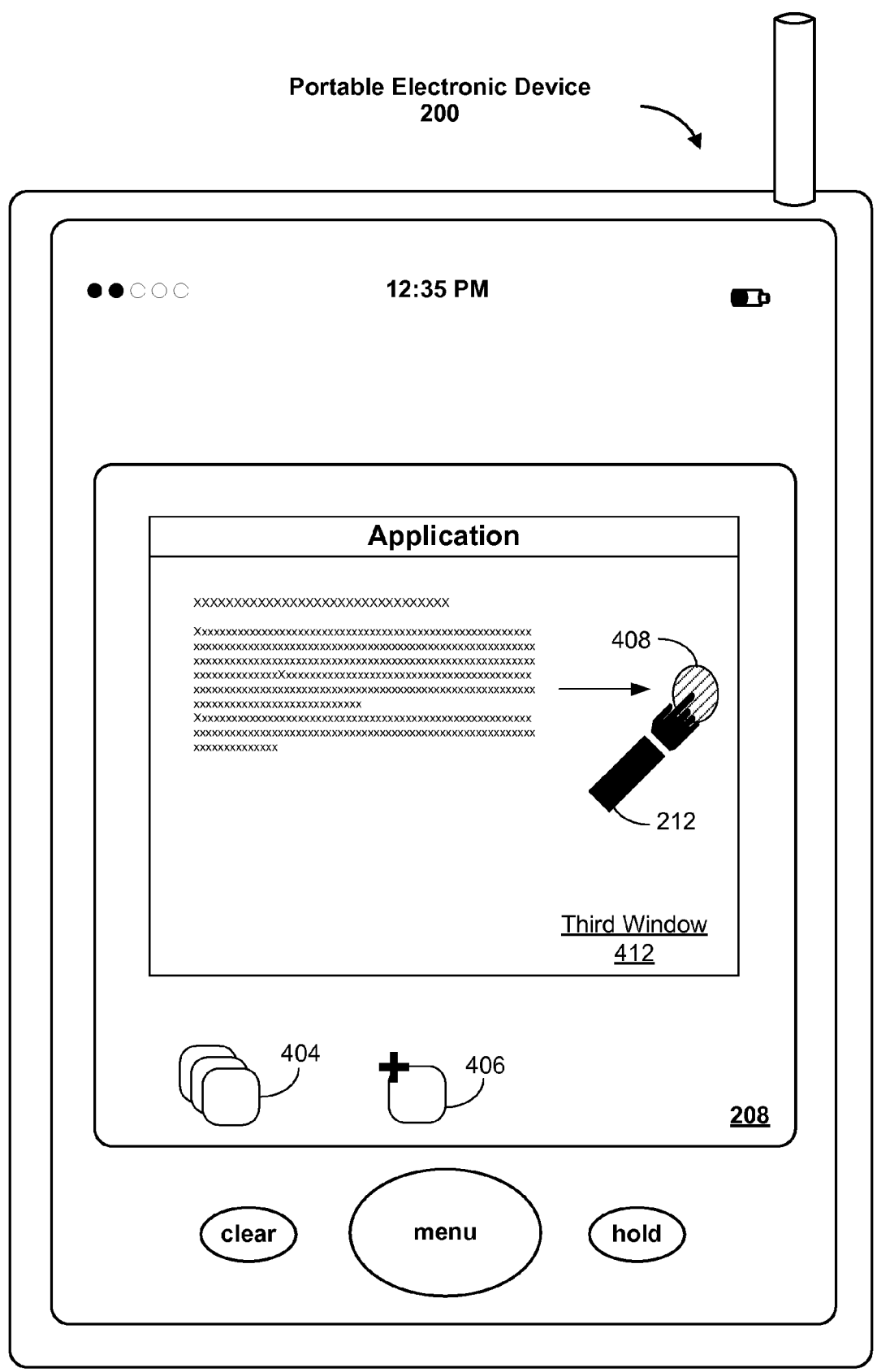
Figure 4F:
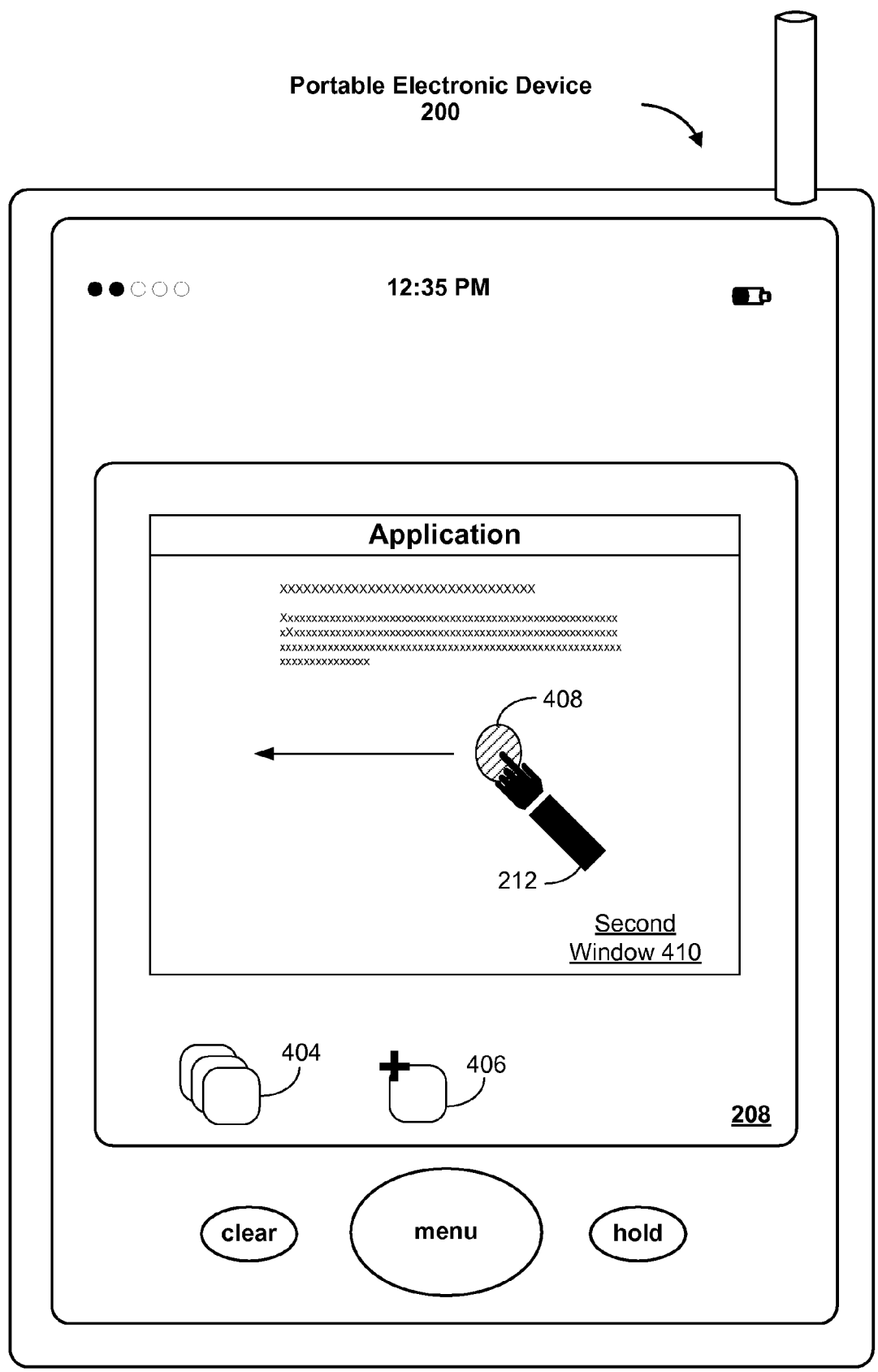
Figure 4G:
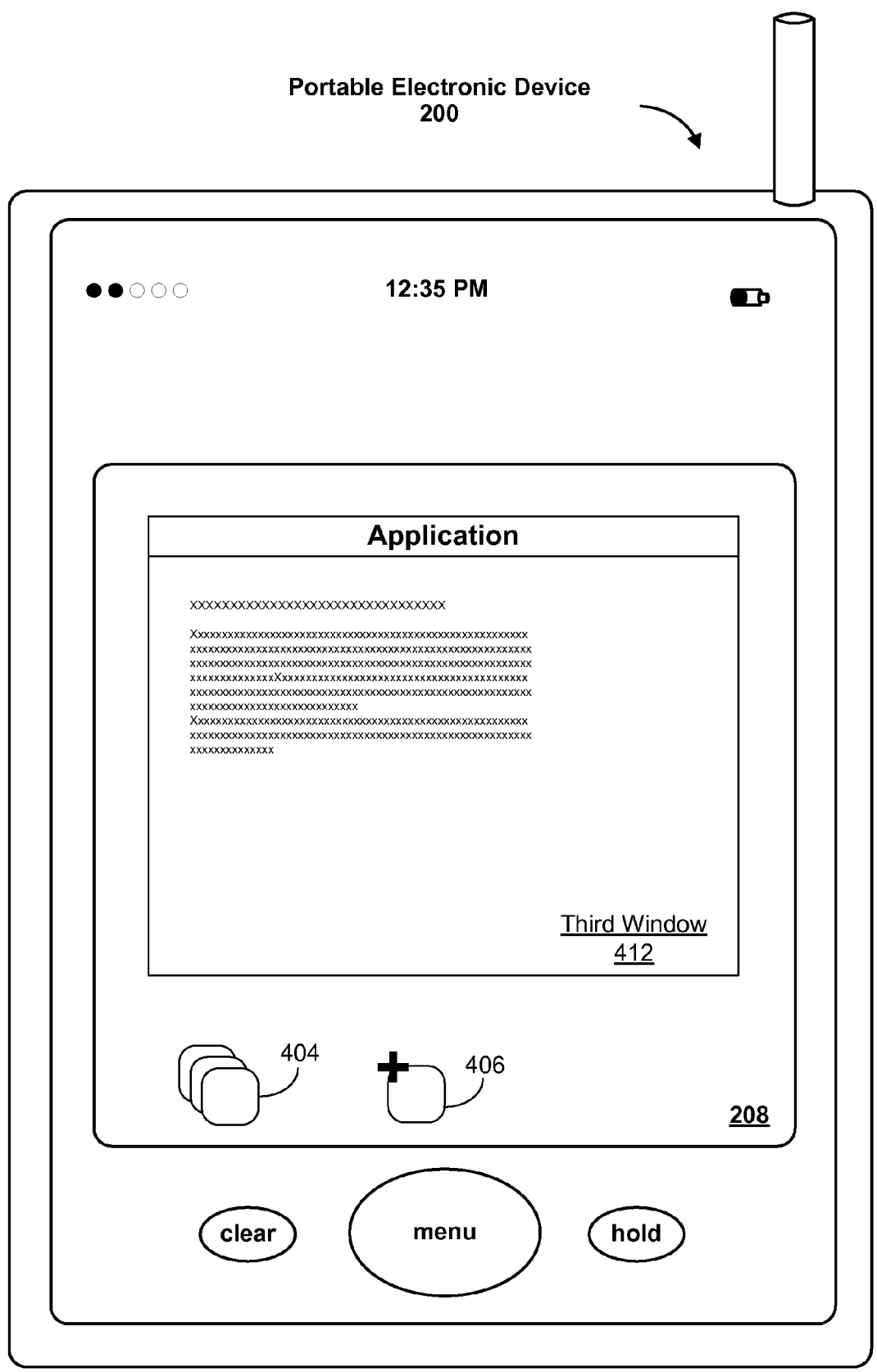

While there are two open windows, one displayed and one hidden, the user may activate the new windows icon 406 again (FIG. 4D) to add a third window 412. The third window is displayed, as shown in FIG. 4E, while whatever window was previously displayed is moved out of view and whatever window(s) are already hidden remain hidden. More generally, the user may add or open as many windows as desired, up to any predefined limit imposed by the application and/or the device 200 and any device resource limitations, such as memory capacity.

When there is a plurality of open windows, the user can "scroll" through the set of windows, one at a time. For example, in some embodiments, while the third window 412 is displayed, the user may perform a rightward swipe (as indicated in FIG. 4E) gesture to reveal the second window 410 (FIG. 4F) and to move the third window 412 out of view horizontally. The user may then perform another rightward swipe to reveal the first window 402 and to move the second window 410 out of view horizontally. While the first window 402 is displayed, the user may perform a leftward swipe to reveal the second window 410 and move the first window 402 out of view horizontally, and then another leftward swipe (see FIG. 4F) to reveal the third window 412 and to move the second window 410 out of view horizontally (see FIG. 4G). While the second window 410 is displayed (see FIG. 4F), the user may perform a rightward or leftward swipe to reveal the first window 402 or the third window 412, respectively.

It should be appreciated that, while the swipe gestures and the displaying of the windows are described above as horizontal gestures moving windows into and out of view horizontally, the gestures and the scrolling may be vertical in some embodiments. The user may perform upward or downward swipes to move windows into and out of view vertically. For example, a downward swipe may move a displayed window downward out of view and move a hidden window downward into view. Furthermore, it should be appreciated that the gestures (swipes and taps) described above are merely exemplary. Alternative gestures may be used.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
    at a portable electronic device with a touch screen display:
        displaying a first window of an application and an icon for initiating creation of multiple windows in the application on the touch screen display;
        detecting activation of the icon for initiating creation of multiple windows;
        in response to detecting activation of the icon for initiating creation of multiple windows, displaying an icon for adding new windows to the application and maintaining display of the first window;
        detecting a first activation of the icon for adding new windows to the application;
        in response to detecting the first activation of the icon for adding new windows to the application, creating and displaying a second window for the application and hiding the first window such that no information about the first window is displayed;
        while displaying the second window, detecting a tap gesture on the right side of the touch screen display; and
        in response to detecting the tap gesture on the right side of the touch screen display, moving the second window off the touch screen display and concurrently moving a third window of the application onto the touch screen display;
        while displaying the third window, detecting a right-to-left swipe on the touch screen display; and
        in response to detecting the right-to-left swipe on the touch screen display, moving the third window off the touch screen display and concurrently moving a fourth window of the application onto the touch screen display.

2. The method of claim 1, further comprising:
    while displaying the fourth window, detecting a second activation of the icon for adding new windows to the application;
    in response to detecting the second activation of the icon for adding new windows to the application, creating and displaying a fifth window for the application and hiding the fourth window such that no information about the fourth window is displayed;
    detecting a second tap gesture on the right side of the touch screen display; and
    in response to detecting the second tap gesture on the right side of the touch screen display, moving the fifth window of the application off the touch screen display and concurrently moving a sixth window of the application onto the touch screen display.

3. The method of claim 1, wherein the windows are web pages.

4. The method of claim 1, wherein the second window is created and displayed in response to detecting the first activation of the icon for adding new windows to the application and wherein displaying the second window includes displaying an animation of the first window moving out of view on the touch screen display.

5. The method of claim 1, wherein the entire third window is moved onto the touch screen display.

6. A method, comprising:
    at a portable electronic device with a touch screen display:
        displaying a first window of an application, wherein the application includes at least one hidden window such that information about the at least one hidden window is concealed;
        while displaying the first window, displaying an icon for adding windows to the application;
        detecting activation of the icon for adding windows;
        in response to detecting activation of the icon for adding windows, adding and displaying a second window to the application and hiding the first window such that no information about the first window is displayed;
        while displaying the second window, detecting a tap gesture on the right side of the touch screen display;
        in response to detecting the tap gesture on the right side of the touch screen display, moving the second window off the touch screen display and concurrently moving a third window of the application onto the touch screen display;
        while displaying the third window, detecting a right-to-left swipe on the touch screen display; and
        in response to detecting the right-to-left swipe on the touch screen display, moving the third window off the touch screen display and concurrently moving a fourth window of the application onto the touch screen display.

7. The method of claim 6, wherein the device is a portable communications device.

8. The method of claim 6, wherein the touch screen display is less than three inches by five inches in size.

9. The method of claim 6, wherein a left-to-right sweeping gesture along the horizontal axis of the touch screen display while displaying the fourth window moves the fourth window and the third window from left to right along the horizontal axis.

10. The method of claim 6, further comprising:
    while displaying the fourth window, detecting a second activation of the icon for adding new windows to the application;
    in response to detecting the second activation of the icon for adding new windows to the application, creating and displaying a fifth window for the application and hiding the fourth window such that no information about the fourth window is displayed;
    detecting a second tap gesture on the right side of the touch screen display; and
    in response to detecting the second tap gesture on the right side of the touch screen display, moving the fifth window of the application off the touch screen display and concurrently moving a sixth window of the application onto the touch screen display.

11. A graphical user interface on a portable electronic device with a touch screen display, a memory, and one or more processors to execute one or more programs stored in the memory, the graphical user interface comprising:
    an icon for adding windows to an application;
    a plurality of windows for the application that includes a first window and at least one hidden window such that information about the at least one hidden window is concealed;
    wherein in response to detecting activation of the icon for adding windows, a second window of the application is added and displayed, and the first window is hidden such that no information about the first window is displayed;
    wherein a tap gesture on the right side of the touch screen is used to move the first window off the touch screen display and to concurrently move a second window of the application onto the touch screen display; and wherein a right-to-left swipe on the touch screen display is used to move the second window off the touch screen display and to concurrently move a third window of the application onto the touch screen display.

12. The graphical user interface of claim 11, wherein the application is a browser application and the plurality of windows display at least two distinct web pages.

13. The graphical user interface of claim 11, wherein the application is a word processing application and the plurality of windows display at least two distinct word processing documents.

14. A portable electronic device, comprising:
   a touch screen display;
   one or more processors;
   memory; and
   one or more programs, wherein the one or more programs are stored in the memory and configured to be executed by the one or more processors, the one or more programs including instructions for:
   displaying a first window of an application, wherein the application includes at least one hidden window such that information about the at least one hidden window is concealed;
   while displaying the first window, displaying an icon for adding windows to the application;
   detecting activation of the icon for adding windows;
   in response to detecting activation of the icon for adding windows, adding and displaying a second window to the application and hiding the first window such that no information about the first window is displayed;
   while displaying the second window, detecting a tap gesture on the right side of the touch screen display;
   in response to detecting the tap gesture on the right side of the touch screen display, moving the second window off the touch screen display and concurrently moving a third window of the application onto the touch screen display;
   while displaying the third window, detecting a right-to-left swipe on the touch screen display; and
   in response to detecting the right-to-left swipe on the touch screen display, moving the third window off the touch screen display and concurrently moving a fourth window of the application onto the touch screen display.

15. The device of claim 14, including instructions for:
   while displaying the fourth window, detecting a second activation of the icon for adding new windows to the application;
   in response to detecting the second activation of the icon for adding new windows to the application, creating and displaying a fifth window for the application and hiding the fourth window such that no information about the fourth window is displayed;
   detecting a second tap gesture on the right side of the touch screen display; and
   in response to detecting the second tap gesture on the right side of the touch screen display, moving the fifth window of the application off the touch screen display and concurrently moving a sixth window of the application onto the touch screen display.

16. The device of claim 14, wherein a left-to-right sweeping gesture along the horizontal axis of the touch screen display while displaying the fourth window moves the fourth window and the third window from left to right along the horizontal axis.

17. A non-transitory computer readable storage medium storing one or more programs, the one or more programs comprising instructions, which when executed by a portable electronic device with a touch screen display, cause the portable electronic device to:
   display a first window of an application, wherein the application includes at least one hidden window such that information about the at least one hidden window is concealed;
   while displaying the first window, display an icon for adding windows to the application;
   detect activation of the icon for adding windows;
   in response to detecting activation of the icon for adding windows, add and display a second window to the application and hide the first window such that no information about the first window is displayed;
   while displaying the second window, detect a tap gesture on the right side of the touch screen display; and
   in response to detecting the tap gesture on the right side of the touch screen display, move the second window off the touch screen display and concurrently moving a third window of the application onto the touch screen display;
   while displaying the third window, detect a right-to-left swipe on the touch screen display; and
   in response to detecting the right-to-left swipe on the touch screen display, move the third window off the touch screen display and concurrently move a fourth window of the application onto the touch screen display.

18. The computer readable storage medium of claim 17, including instructions that cause the device to:
   while displaying the fourth window, detect a second activation of the icon for adding new windows to the application;
   in response to detecting the second activation of the icon for adding new windows to the application, create and display a fifth window for the application and hide the fourth window such that no information about the fourth window is displayed;
   detect a second tap gesture on the right side of the touch screen display; and
   in response to detecting the second tap gesture on the right side of the touch screen display, move the fifth window of the application off the touch screen display and concurrently move a sixth window of the application onto the touch screen display.

19. The computer readable storage medium of claim 17, wherein a left-to-right sweeping gesture along the horizontal axis of the touch screen display while displaying the fourth window moves the fourth window and the third window from left to right along the horizontal axis.

* * * * *